J. MATTHEWS.
LAND AND WATER VEHICLE.
APPLICATION FILED JULY 1, 1909.
944,044.
Patented Dec. 21, 1909.
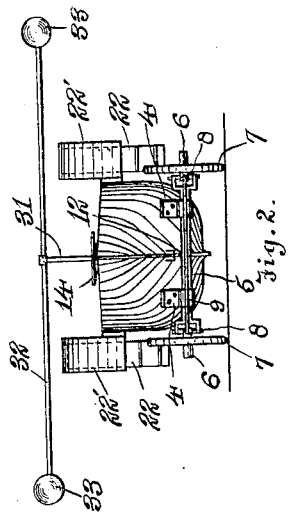
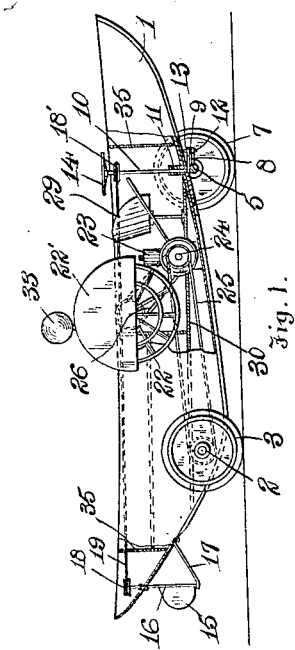
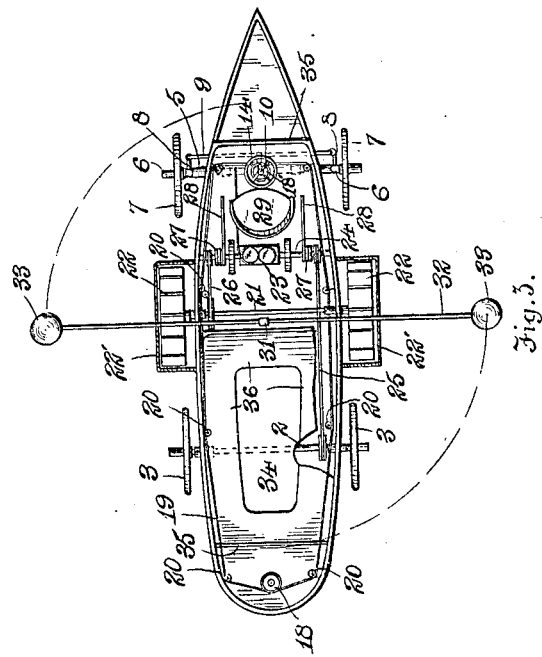
Witnesses:
Inventor:
John Matthews.
By Joshua R. H. Potts
his Attorney.

UNITED STATES PATENT OFFICE.

JOHN MATTHEWS, OF CHICAGO, ILLINOIS.

LAND AND WATER VEHICLE.

944,044.

Specification of Letters Patent.   Patented Dec. 21, 1909.

Application filed July 1, 1909. Serial No. 505,489.

*To all whom it may concern:*

Be it known that I, JOHN MATTHEWS, a citizen of the United States, residing at Chicago, county of Cook, and State of Illinois, have invented certain new and useful Improvements in Land and Water Vehicles, of which the following is a specification.

My invention relates to a combined land and water vehicle.

The object of my invention is to provide a vehicle of a nature as stated in which will be provided means for effectually propelling and steering the same as readily on land as in water.

A further object is the provision of a vehicle as mentioned which will be efficient, of neat and finished appearance and of strong, durable and economical construction.

Other objects will appear hereinafter.

With these objects in view my invention consists in an amphibious vehicle characterized as above mentioned and in certain details of construction and arrangement of parts all as will be hereinafter fully described and particularly pointed out in the appended claims.

My invention will be more readily understood by reference to the accompanying drawings forming a part of this specification, and in which, Figure 1 is a side elevation of my vehicle in its preferred form, portions thereof being broken away to better illustrate its construction, Fig. 2 is a front elevation thereof, and Fig. 3 is a top plan view, portions being broken away to expose underlying parts.

Referring now to the drawings, 1 indicates the body of the vehicle, which, as shown, is in the form of a boat of suitable design.

Mounted in and transversely extending through the stern of the body 1 is an axle 2 upon the exteriorly projecting extremities of which are carried traction wheels 3 of any suitable construction.

Mounted in bearings 4 provided upon the under surface of the bow or forward end of the body, is a stationary shaft 5 in knuckled connection with the outer extremities of which are axles 6 mounted upon which are suitable wheels 7 supporting the bow of said body. Projecting from and formed integrally with axle 6 are arms 8 connecting the outer extremities of which is a rod 9.

10 indicates a steering shaft mounted at its lower end portion in a suitably packed bearing 11. Formed rigid with the lower extremity of said shaft is a projecting arm 12 the outer extremity of which is pivotally connected, as at 13, to the rod 9. By means of said arm, the wheel 7 may evidently be actuated in steering the vehicle on land, by simply rocking the shaft 10.

14 indicates a hand wheel provided at the upper extremity of the shaft 10 to facilitate the manual rotation of the latter.

Provided exteriorly of and below the stern of the body is a rudder blade 15 the stem 16 of which is mounted at its lower extremity in a bearing bracket 17 projecting from said body, the upper end portion thereof projecting through the bottom of the body into the interior of the latter, and being provided with a channel pulley 18. A cord or other suitable connecting means 19 traveling around said pulley, over guide rollers 20, and around a similar channel pulley 18' carried by the shaft 10, establishes an operative connection between the latter and the rudder.

Journaled in the body 1, close to the upper edge thereof, and substantially midway the extremities thereof, is a transversely extending shaft 21, at the outer extremities of which are carried paddle or propelling wheels 22 of suitable design and dimensions. Inclosing the upper portions of said wheels are the usual stationary semi-circular splash shields or housings 22'.

Suitably mounted and positioned upon the bottom of the body is the driving means 23 of the vehicle, the same, as shown, preferably comprising a gas engine of suitable design. One extremity of the drive or power shaft 24 of said engine is operatively connected by a belt or other flexible connecting means 25 to the axle 2, the opposite extremity thereof being operatively connected by similar connecting means 26, to the shaft 21. Clutches 27 interposed in said end portions of said shafts, the actuating levers 28 thereof being positioned for ready engagement by the vehicle driver from his seat 29 suitably supported upon the floor 30 of the body, effect a means whereby the axle 2 and the shaft 21 may be independently driven. Hence when traveling on land, the shaft 21 may be thrown out of operation and the axle 2 only driven; and when traveling in the water, the reverse conditions may be effected.

Suitably mounted at its center upon a rotatably adjustable upright 31 suitably secured centrally in the body 1, is a rod 32 at each of the extremities of which is carried a balance weight 33. Such provision is made to facilitate and maintain the correct poising or balancing of the vehicle particularly when traveling in the water, and to thereby prevent capsizing thereof. This is due to the fact that the weights partaking of the motion of the boat have a tendency to continue in the same straight line and thus prevent rocking of the boat. In the cock pit 34 of the body 1 which is preferably set off by transverse partitions 35, is arranged a series of seats 36 for the accommodation of passengers to be carried.

While I have shown what I deem to be the preferable form of my vehicle I do not wish to be limited thereto as there might be many changes made in the details of construction and arrangement of parts without departing from the spirit of the invention comprehended within the scope of the appended claims.

Having described my invention what I claim as new and desire to secure by Letters Patent is:

1. A vehicle of the class described, comprising a boat body, traction wheels at the stern and steering wheels at the bow of said body and supporting the same, a rudder mounted at the stern of said body, means for actuating said rudder and said steering wheels, paddle wheels mounted at the sides of said body intermediate the extremities thereof, driving means carried in the body operatively connected with said paddle wheels and said traction wheels, a centrally positioned transversely extending balancing rod carrying balancing weights at its extremities, and seats provided in the cock pit of said body, substantially as described.

2. A vehicle of the class described, comprising a boat body, a traction axle carrying traction wheels journaled in the stern of said body, steering wheels mounted for oscillation under the bow of said body, a rudder rockingly mounted at the stern of said body, a steering shaft rockingly mounted in the bow of said body, operative connections between said steering shaft and said rudder, and said steering shaft and said steering wheels, an operator's seat arranged adjacent said steering shaft, a transversely disposed shaft journaled in the sides of said body intermediate the extremities thereof, paddle wheels carried at the extremities of said shaft, a stationary housing inclosing the upper portion of each of said paddle wheels, a driving motor arranged in said body, flexible means operatively connecting said traction axle and the power shaft of said motor, and said paddle shaft and said motor power shaft, clutches interposed in said power shaft whereby said traction axle and said paddle shaft may be independently driven, and a transversely extending centrally positioned balancing rod mounted over said body carrying balancing weights at its extremities, substantially as described.

In testimony whereof I have signed my name to this specification in the presence of two subscribing witnesses.

JOHN MATTHEWS.

Witnesses:
HELEN F. LILLIS,
JOSHUA R. H. POTTS.